Jan. 9, 1968  FUMIO MIHARA  3,362,773

SPECIAL PHOTOGRAPHING METHOD FOR MOVIES AND TELEVISION

Filed Feb. 5, 1965

United States Patent Office 3,362,773
Patented Jan. 9, 1968

3,362,773
SPECIAL PHOTOGRAPHING METHOD FOR
MOVIES AND TELEVISION
Fumio Mihara, 48–4 Kuwazu-cho Higashisumiyashi-ku,
Abeno-ku, Osaka, Japan
Filed Feb. 5, 1965, Ser. No. 430,630
5 Claims. (Cl. 352—44)

ABSTRACT OF THE DISCLOSURE

A method of making movies and television pictures having special effects in which the picture has a proper background with a figure superimposed thereon, comprising simultaneously photographing the figure at the same speed with two cameras spaced from and facing each other with the object midway between the cameras, while providing a screen facing the first camera and through which the second camera projects to photograph, which screen is dark black, and providing a screen facing the second camera and through which the first camera projects to photograph which screen is white, lighting the white screen and lighting the figure from the side of the first camera, combining the film exposed by the second camera with a film of the background to be used to produce a film with a clear space having the shape of the figure to be superposed, and then combining the film exposed by the first camera with the last-mentioned film to insert the figure from the first film into the space on the said last-mentioned film.

---

This invention relates to a special photographing method which produces the same effect as an actual open-air photographing of a figure at a desired spot by photographing the figure using the film on which the desired scene has been photographed separately as the background, and the object of the method is to realize unprecedented superb effects freely and easily by the application of this method to the fanciful scientific movies and television.

Figure 1:
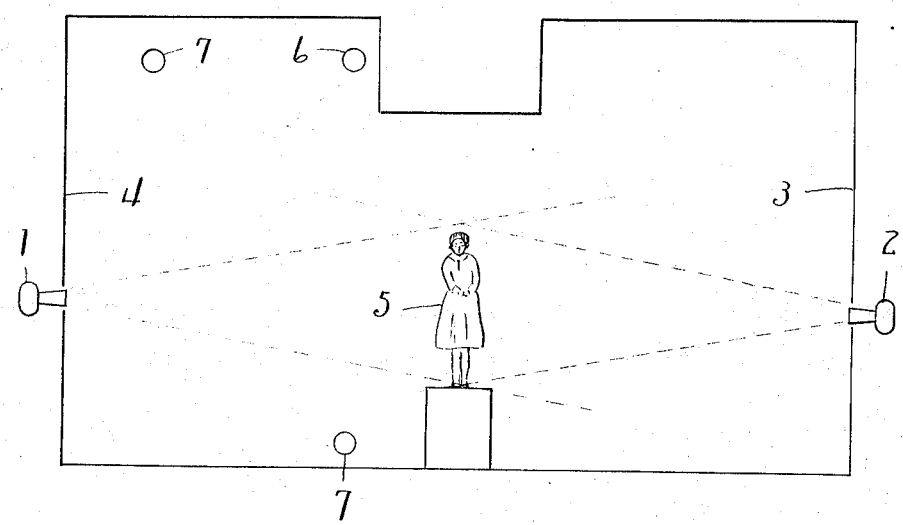
Figure 2:
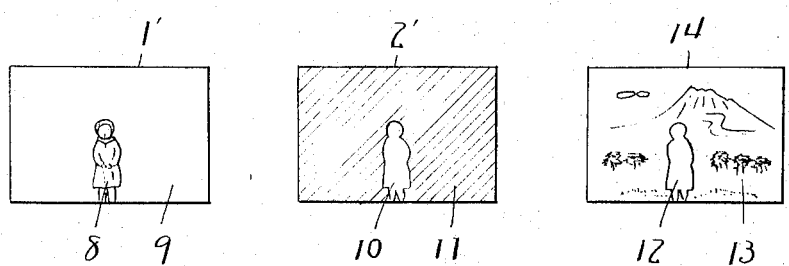

The attached drawings show an embodiment of the present invention, in which FIG. 1 is an elevation view showing photographing conditions; and FIGS. 2a–2c are each a plan view of piece film.

An embodiment of the present invention described with reference to the attached drawings is as follows.

As FIG. 1 shows, two movie cameras 1 and 2 with zoom lenses, only the lenses peeping out of the small holes in two screens 3 and 4, are placed facing each other, the screen 3 facing the camera 1 being dark black and the screen 4 facing the other camera 2 being white. Then, placing the object 5 like a figure in the middle between the cameras 1 and 2, keeping the distance and angle to the cameras equal, supplying illumination from the light 6 to the white screen and supplying illumination from the light 7 to the object from the side of the camera 1, the object 5 is photographed by the cameras simultaneously at the same speed. In this manner, the object 5 becomes a negative picture 8 on the film 1', shown in FIG. 2a, in the camera 1; the remaining part 9, having been unexposed the background of the object 5 being the black screen 3, becomes transparent, and the object 5 thus appears as a negative picture 8 on a transparent background.

On the other hand, though the object 5 remains transparent 10 on the film 2', shown in FIG. 2b, of the camera 2, the object 5 having become a shadow and undetailed due to the backlighting, the remaining part 11 becomes completely exposed and black, for the background is the white screen 4. In this case, the distance and angle of the cameras 1 and 2 relative to the object 5 being kept equal, the negative figure 8 and shadow 10 of the object 5 are photographed bilaterally symmetrically at the same size on the respective pieces of film 1' and 2'. (This step is called the 1st photographing.) In this instance, one can photograph the object bilateral identically, not bilateral symmetrically, by installing the prism on one camera.

In case of photographing by the above-mentioned method, when photographing the object a positive film on which the desired scenery has been photographed is placed on the top of the raw film in the camera 2, so that the background becomes a negative picture 13 and the object 5 becomes transparent 12 as shown in FIG. 2c. Photographing through the film 14 thus made and the before-mentioned film 1', piling one on the top of the other so that the objective figures on respective films correspond, the negative figure 8 on the film 1' is photographed in the transparent part 12 of the film 14, and therefore the desired scene appears as a positive picture in the background of the positive figure of the object. (This is called the 2nd photographing.)

Alternatively after producing the film 1' and 2' by 1st photographing, changing the film 2' into positive, thus making the transparent figure 10 of the object 5 dark black and making the other part 11 transparent and putting the film thus made on the top of the raw film in case of an open-air photographing, the object is photographed on the raw film unexposed and will become transparent in the negative background of the actual scenery like the before-mentioned film 14. Then by the same method as the 2nd photographing, photographing through the film 1', the object appears as a positive in the positive background.

Moreover, after producing the film 1' and 2' by the 1st photographing method, changing them to positive, and photographing by putting the positive of the film 2' on the top of the film photographing the scenery, then turning back the film, putting this on the top of the positive of the film 1' and photographing by putting a white plate in front of the lens, both the background and the objective figure will be photographed as a negative.

In the composed movies in the past, though they require much time and expenses, they could not photograph the moving object successfully, for they could only piece-photograph.

According to this invention, being possible to get a set of positive and negative moving pictures by high speed photographing, they can be composed in the broadcasting of movies and television.

If you want to apply this invention to television, using a television camera instead of a movie camera in the 1st photographing, letting the actual photographing film of scenery run closely in front of the image orthicon in the television camera 2, the shadow of the object 5 appears in the picture of the actual photographing film in the image orthicon. Adjusting the objective figure, photographed by the camera 1 so that it becomes at one with this shadow, the object appears in the desired scenery naturally and clearly on the television screen.

In case of applying it in actual broadcasting of television, after producing the film 1' and 2' by the 1st method, changing the film 1' and 2' into positive and letting film 2' run in the television camera, actually broadcasting, the shadow of the object 5 appears at the spot of broadcasting. Adjusting the positive of the film 1' to be at one with the above-mentioned shadow part, the figure of the object 5 appears in the actual broadcasting spot on the television screen.

In addition, casing a color film as a raw film and the film for background, this invention is applicable to color movies and color television.

I claim as my invention:

1. A method of making movies and television pictures having special effects in which the picture has a proper background with a figure superimposed thereon, comprising simultaneously photographing the figure at the same speed with two cameras spaced from and facing each other with the object midway between the cameras, while providing a screen facing the first camera and through which the second camera projects to photograph, which screen is dark black, and providing a screen facing the second camera and through which the first camera projects to photograph, which screen is white, lighting the white screen and lighting the figure from the side of the first camera, combining the film exposed by the second camera with a film of the background to be used to produce a film with a clear space having the shape of the figure to be superposed, and then combining the film exposed by the first camera with the last-mentioned film to insert the figure from the first film into the space on the said last-mentioned film.

2. The method as claimed in claim 1 in which the step of combining the film exposed by the second camera with the film of the background comprises inserting a positive film of the background into the second camera over the unexposed film in the second camera, whereby the film which results is a negative of the background with a space corresponding to the figure to be superposed, and the step of combining the film exposed by the first camera with the last-mentioned film comprises photographing the last-mentioned film and the negative film exposed by the first camera together, whereby there is produced a positive film of the background with the figure superposed thereon.

3. The method as claimed in claim 1 in which the step of combining the film exposed by the second camera with the film of the background comprises changing the film exposed by the second camera to a positive, inserting it into a third camera containing unexposed film on which is to be filmed the background, filming the background with the third camera, whereby the film which results is a negative of the background with a space corresponding to the figure to be superposed, and the step of combining the film exposed by the first camera with the last-mentioned film comprises photographing the last-mentioned film and the negative film exposed by the first camera together, whereby there is produced a positive film of the background with the figure superposed thereon.

4. The method as claimed in claim 3, in which the step of combining the film exposed by the first camera with the last-mentioned film comprises changing the film exposed by the first camera to a positive, inserting it into a camera in which the last-mentioned film is positioned, and photographing it against a white screen, whereby there is produced a negative of the desired film.

5. The method as claimed in claim 1 in which the step of combining the film exposed by the first camera with the last-mentioned film comprises broadcasting a television signal of the last-mentioned film and simultaneously broadcasting a television signal of the film from the first camera, whereby the image on the receiver will be the combined image of the background with the figure superposed thereon.

References Cited

UNITED STATES PATENTS

| | | | |
|---|---|---|---|
| 1,173,521 | 2/1916 | Hunter | 352—44 |
| 1,286,383 | 12/1918 | Messter | 352—40 |
| 1,742,680 | 1/1930 | Artigue | 352—49 |
| 2,054,401 | 9/1936 | Whitman | 352—88 |
| 2,337,327 | 12/1943 | Haskin | 352—88 |
| 2,651,233 | 8/1953 | Tondreau et al. | 95—18 |

FOREIGN PATENTS 219,993  7/1924  Great Britain.

JULIA E. COINER, *Primary Examiner.*